May 26, 1970     I. P. JONES ET AL     3,513,613

FILM FACED FIBROUS BODY AND APPARATUS FOR SUPPORTING THE SAME

Original Filed Feb. 26, 1965     5 Sheets-Sheet 1

ISAAC PALMER JONES,
HOMER W. DUFFEE
DANIEL A. McCARTAN &
JOHN W. REID
INVENTORS

BY

ATTORNEYS

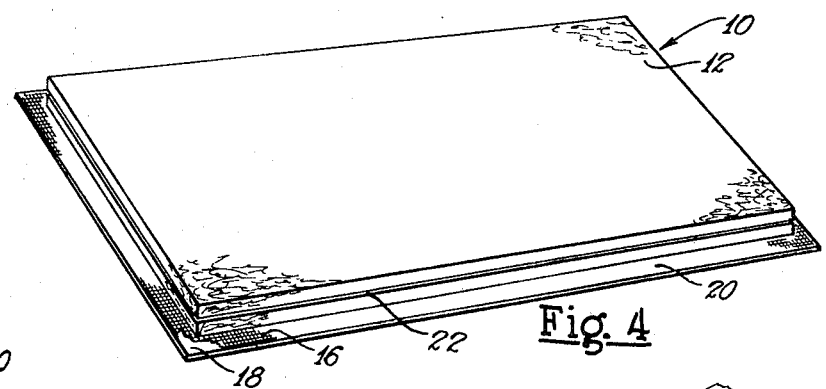
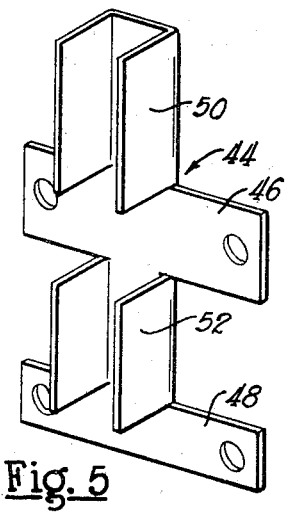
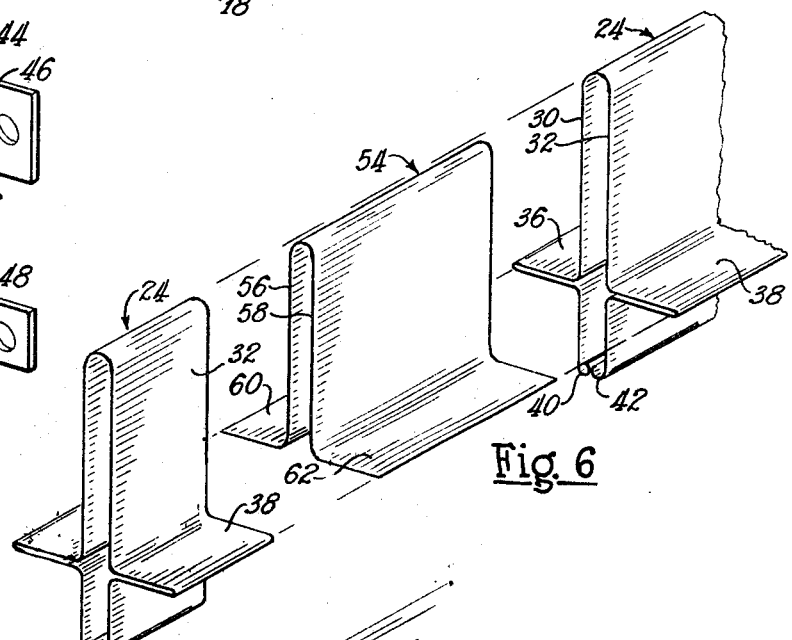
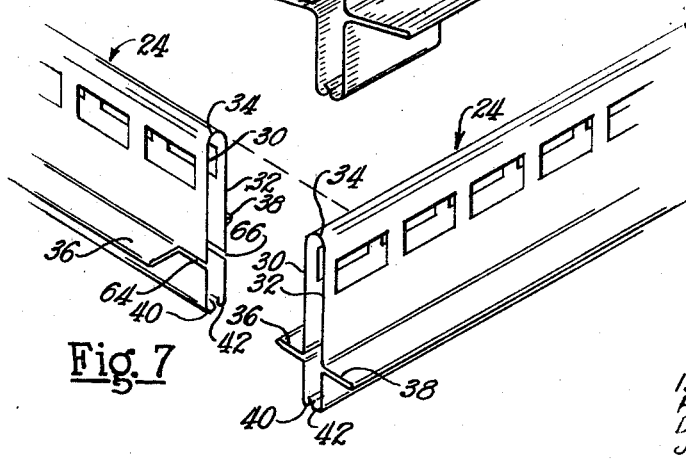

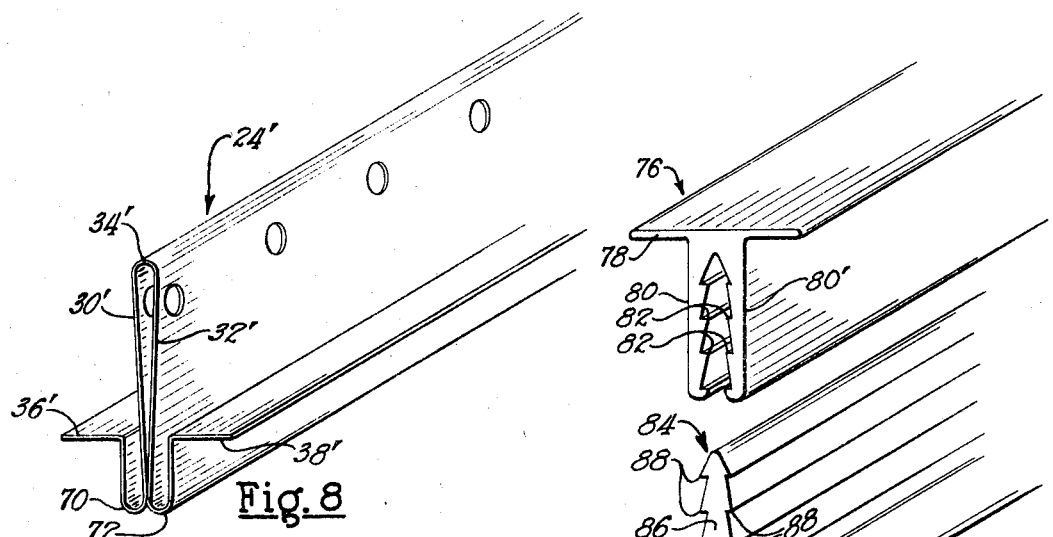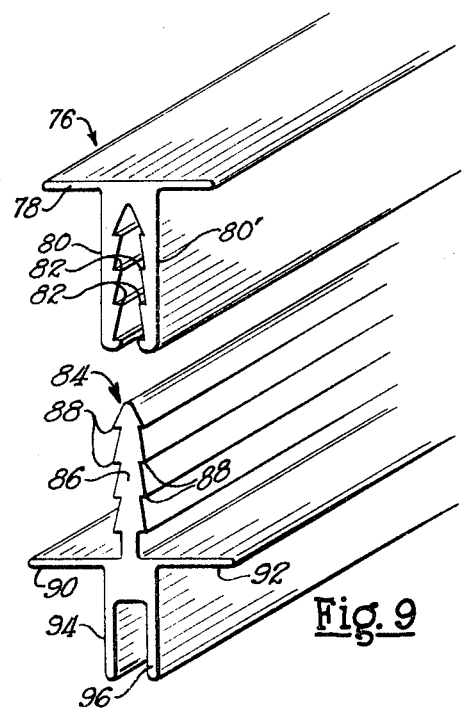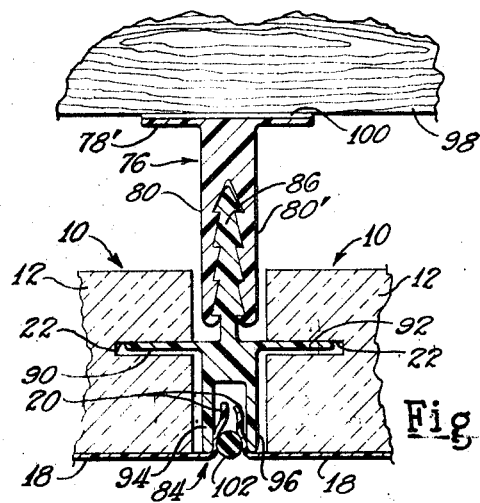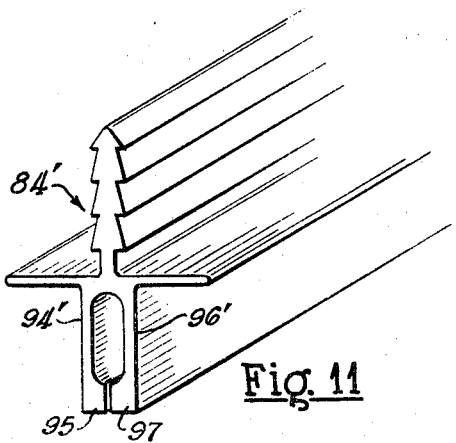

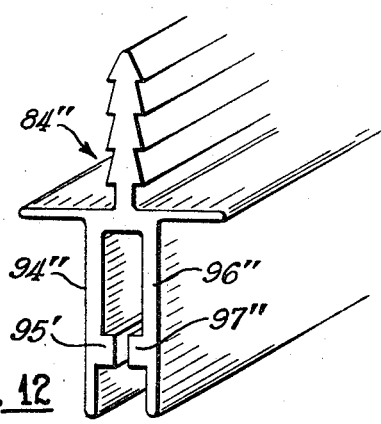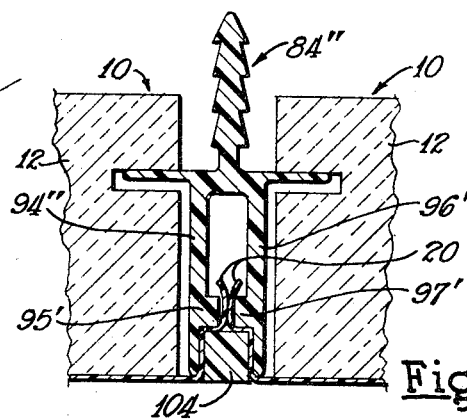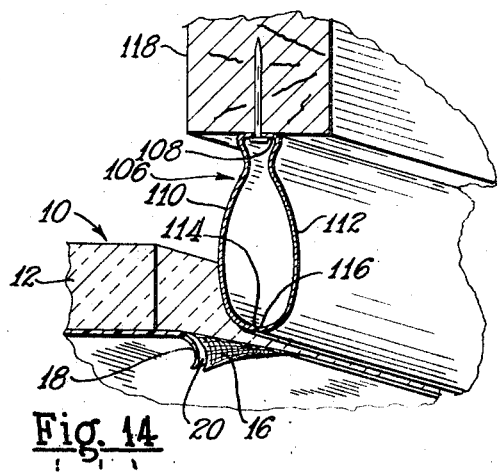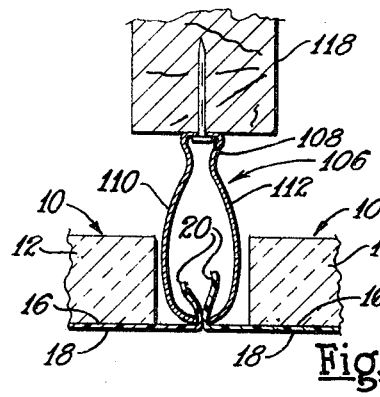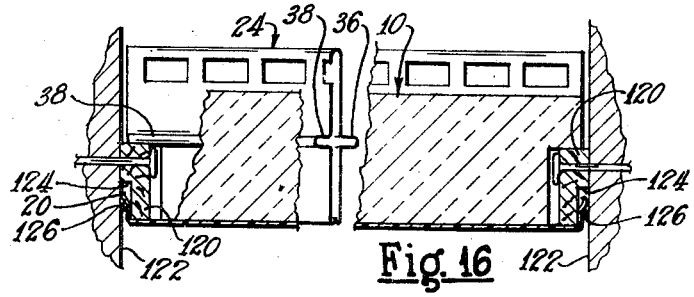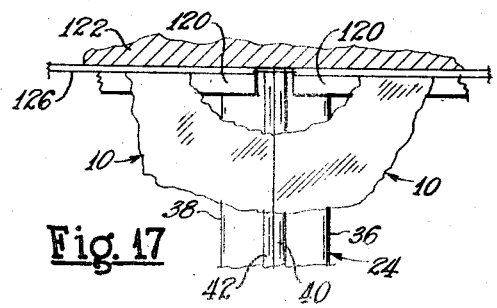
ISAAC PALMER JONES,
HOMER W. DUFFEE
DANIEL A. McCARTAN &
JOHN W. REID
INVENTORS
ATTORNEYS ISAAC PALMER JONES,
HOMER W. DUFFEE
DANIEL A. McCARTAN &
JOHN W. REID
INVENTORS United States Patent Office 3,513,613
Patented May 26, 1970

3,513,613
FILM FACED FIBROUS BODY AND APPARATUS FOR SUPPORTING THE SAME
Isaac Palmer Jones, Homer W. Duffee, Daniel A. McCartan, and John W. Reid, Newark, Ohio, assignors to Owens-Corning Fiberglas Corporation, a corporation of Delaware
Continuation of application Ser. No. 435,492, Feb. 26, 1965. This application Jan. 31, 1968, Ser. No. 702,131
Int. Cl. E04b 5/52
U.S. Cl. 52—222                                      1 Claim

ABSTRACT OF THE DISCLOSURE

A support system for a monolithic appearing surface comprised of a series of grid-like supporting members with oppositely projecting flange means to be received within kerfed edges of associated panels and clamping means for receiving free film edges which extend beyond the main body of the panels.

This application is a continuation of co-pending application Ser. No. 435,492, filed Feb. 26, 1965 now abandoned.

This invention relates to film faced fibrous bodies and more particularly to bodies fabricated of mineral fibers having a major surface faced with a resinous film glass fabric or combination thereof having portions extending laterally beyond the marginal edges of the fibrous material and apparatus for supporting the fibrous bodies.

The invention more particularly pertains to fibrous mats, boards or tiles formed of mineral fibers, such as fibers of glass, slag or other mineral material, wherein the mats, boards or tiles are supported by concealed supporting apparatus to produce a monolithic ceiling having acoustical and thermal insulating properties.

An object of the invention is to provide a fibrous panel for use in a monolithic ceiling or wall with new and improved means by which it can be mounted in position of use in such manner that the resultant structure is relatively smooth and unbroken and the appearance enhanced.

Another object of the present invention is the production of an article of manufacture comprising a body of bonded fibrous material having a layer of flexible sheet material adhered to a major surface thereof and an edge portion of the layer extending laterally beyond the side edges of the body to provide a product having high strength characteristics, and thermal and acoustical insulating properties rendering the product particularly suitable for use in fabricating monolithic ceiling or wall structures.

Still another object is to produce a support for use in connection with a monolithic ceiling or wall construction which depends from an established securement and is equipped with unique clamping device for supporting engagement with a contiguous fibrous body or panel.

A further object of the invention is the provision of a monolithic ceiling comprising a body of bonded fibrous material having a layer of flexible sheet material adhered to a major surface thereof and an edge portion of the layer extending laterally beyond the side edges of the body, and a support member depending from a previously secured means and having a downwardly depending resilient clamping means for receiving and retaining the edge portion of the flexible sheet material adhered to the fibrous body to support the body rendering a monolithic ceiling assembly.

Other objects and advantages of the invention will become readily apparent from a consideration of the following detailed description of several embodiments of the invention when considered in the light of the accompanying drawings, in which:

FIG. 4 is an enlarged perspective view of a fibrous panel embodying the features of the invention;

FIG. 5 is a perspective view of a wall mounted bracket for supporting the end of the supporting members;

FIG. 6 is an exploded perspective view of a supporting member and a splice member for interconnecting the ends of associated supporting members;

FIG. 7 is an exploded fragmentary perspective view showing the structure for interconnecting two supporting members at right angles to one another;

FIG. 8 is a fragmentary perspective view of a modified form of supporting member of the invention;

FIG. 9 is a perspective fragmentary exploded view of another modification of the supporting structure of the invention;

FIG. 10 is a fragmentary sectional view showing the structure illustrated in FIG. 9 in operative position supporting associated reinforced film faced fibrous bodies;

FIG. 11 is a fragmentary perspective view of a modified form of the supporting member illustrated in FIGS. 9 and 10;

FIG. 12 is a fragmentary perspective view of still another modified form of the supporting member;

FIG. 13 is a fragmentary elevational view of the structure illustrated in FIG. 12 in an operative position supporting associated reinforced film faced fibrous panels of a ceiling construction;

FIG. 14 is a fragmentary perspective view of a modified form of a supporting member for supporting the fibrous product of the invention;

FIG. 15 is a fragmentary elevational view in section illustrating the modification of the supporting member of FIG. 14;

FIG. 16 is a fragmentary elevational view partly in section of a ceiling structure employing means for supporting the main support elements and providing a means for retaining the film overlap adjacent the side wall of the room;

FIG. 17 is a fragmentary bottom plan view of a portion of the structure illustrated in FIG. 16;

Figure 22:
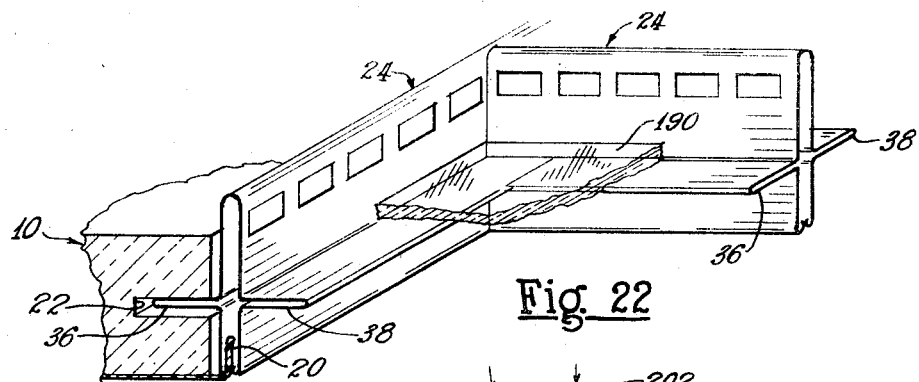
Figure 23:
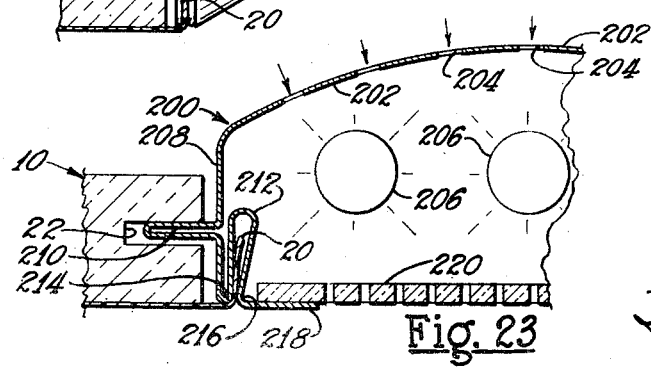

FIG. 22 is a fragmentary perspective view partly in section illustrating an arrangement of supporting elements for simultaneously supporting the fibrous product of the invention and a lighting fixture or the like; and FIG. 23 is a fragmentary sectional view of a modified arrangement for supporting the fibrous product of the invention together with a recessed lighting, heating, and ventilating unit.

The reinforced film faced fibrous body of the invention may typically be formed of mineral fibers, such as glass fibers, reinforced by a suitable means and faced with a resin film of fabric usable as a surfacing material, such as for providing an acoustical ceiling or in other applications where a lightweight, high strength material is desired.

Referring to the drawings, FIGS. 1, 2, 3 and 4 illustrate one form of the fibrous panel of the invention, generally indicated by reference numeral 10, which is reinforced to provide high strength characteristics of a character usable with thermal insulation, surfacing material, or an acoustical mat having particular application for ceilings or walls wherein the film facing enhances the overall appearance of the product without appreciably affecting the sound or acoustical attenuating properties of the fibrous body. The base or body 12 of the panel 10 is formed of mineral fibers, such as glass fibers, and the fibers are pre-compressed to a predetermined density established by the end use required for the product. In the event that substantial rigidity is required, the body 12 may have a density, for example, of eight pounds per cubic foot. However, where such rigidity is not required, the body 12 may be formed of a mass of glass fibers of a density of the order of three pounds per cubic foot or less.

The body 12 may be a thickness of from five-eighths of an inch to two inches or more, for example, dependable upon the end use requirements of the product. The fiber glass body or mat 12 is manufactured in the conventional manner wherein, for example, attenuated glass fibers, containing an outer coating of a suitable binder material, such as phenol formaldehyde, are collected on a forming chain and compressed to the desired thickness and density. The binder material is typically uncured as the mass is collected upon the forming chain. The collected mass is then directed in its compressed condition through a zone of an elevated temperature sufficient to cure the binder to achieve dimensional and mass stability to the plurality of glass fibers constituting the body 12.

Figure 2:
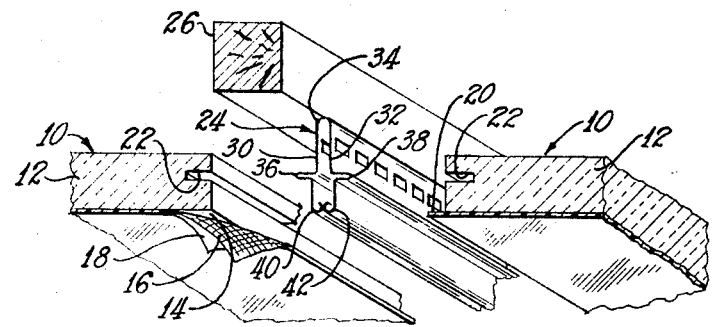
FIG. 2 is an exploded fragmentary view of the structure illustrated in FIG. 1.

As particularly shown in FIG. 2, there is arranged contiguous to a major surface 14 of the body 12, a reinforcing layer of flexible scrim textile material 16, which may be typically joined to the surface 14 of the body 12. Superimposed on the scrim reinforcement 16 is a resinous film 18 which is typically adhesively bonded or joined with the reinforcing material 16, thereby producing a laminated, scrim reinforced film faced fibrous product or panel 10.

The scrim textile material 6 is preferably formed of strands or yarns of glass filaments or fibers fabricated as an open mesh textile wherein the strands of yarn are woven in formation of the scrim component. The facing film 18 is in the form of a prefabricated, self-supporting film, such as a vinyl film preferably containing an embossing to present an attractive overall appearance and simultaneously masking the mesh pattern of the scrim textile material 16.

The scrim textile material 16 is adhesively joined to the major surface or area 14 of the fibrous body 12 and the facing film 18 is adhesively joined to the scrim textile material 16 by a suitable adhesive of the type to create a permanent bond for holding the components in their assembled relation. The adhesive preferably includes a solvent type synthetic rubber base, such as a neoprene rubber which contains other constituents or fillers to act as a flame resistant medium.

The fibrous body 12, the scrim textile material 16 and the film facing 18 are processed by the use of conventional laminating methods by which the adhesive securely connects the textile scrim material to the fibrous body 12 and the film 18 to the textile scrim material which functions as a reinforcement media. The laminated product is conveyed through a heated oven in which air is circulated for setting the adhesive and accelerating the evaporation of any solvent contained therein. It will be manifest that other types of adhesive materials may be used to achieve the desired objectives.

The end product illustrated in FIGS. 1, 2, 3 and 4 is fabricated in such manner that the resinous film and/or the associated textile scrim material 16 projects outwardly beyond the edge of the fibrous body 12 to form an overlap or extension 20 which is typically coextensive with the associated edge portion of the fibrous body 12. The specific function of the overlap or extension 20 will be fully appreciated as the description of the invention develops.

The edge wall of the fibrous body 12 may be provided with a precut groove or kerf 22 formed by any suitable means such as, for example, a rotary cutting tool.

The end product or panel 10 which consists of the fibrous mat body 12, the textile scrim reinforcing material 16, and the facing or layer 18 of a resinous film material, may typically be employed as a thermal insulation, an acoustical element, a vapor barrier or a surfacing board for walls and ceilings. While the product has application for use as a surfacing board for walls, the invention finds particular use in the fabrication of a monolithic ceiling typically comprised of a plurality of individual composite panels 10. Since the panels are identical with one another insofar as their structural components are concerned, like reference numerals are used throughout the description to illustrate similar structural items.

The ceiling installation is composed of a plurality of ceiling panels 10 supported by supporting members 24 which can be suspended by wires, string, glass fiber cord, etc.; or can be stapled or otherwise mechanically fastened to overhanging frame members, such as wooden joists 26. In the particular installation illustrated in FIGS. 1, 2 and 3, the support members 24 are mechanically fastened to the wood joists 26 by means of wire hanger devices 28.

The support member 24 may be fabricated from a resilient sheet material such as relatively light gauge metal, for example. The support member 24 has a pair of spaced parallel side walls 30 and 32, the upper ends of which are integrally joined together as at 34. Between the upper and lower ends of the side walls 30 and 32, there is provided a pair of outwardly extending rib flanges 36 and 38, respectively, which extend in opposite directions away from their respective side walls. The free or lower ends of the side walls 30 and 32 are formed with inwardly and upwardly curved end portions 40 and 42 which are normally urged into engagement with one another under the spring-like action of the side walls 30, 32 and the associated juncture 34 therebetween. However, in certain applications, the weight of the panels 10 may be sufficient to effect the contacting engagement of the end of portions 40 and 42, as will become more apparent hereinafter.

Figure 1:
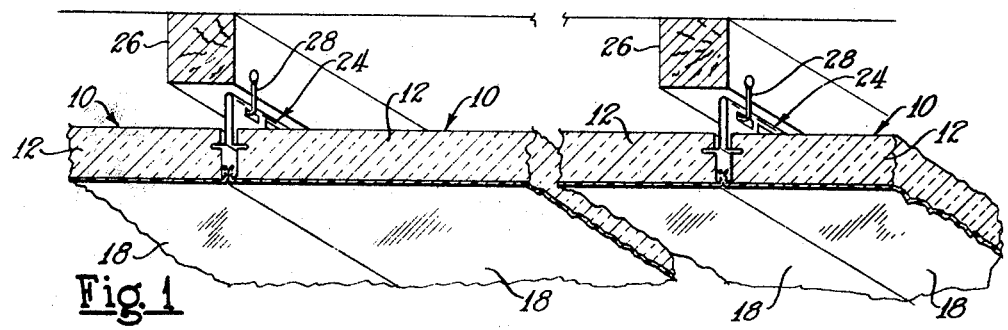
FIG. 1 is a fragmentary perspective view of a ceiling structure employing a reinforced film faced fibrous body with supporting members fabricated in accordance with the invention.
Figure 3:
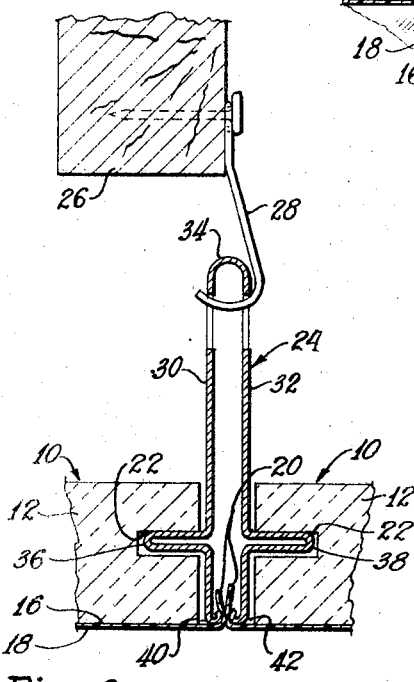
FIG. 3 is an enlarged fragmentary elevational view of the structure illustrated in FIG. 1.
Figure 3A:
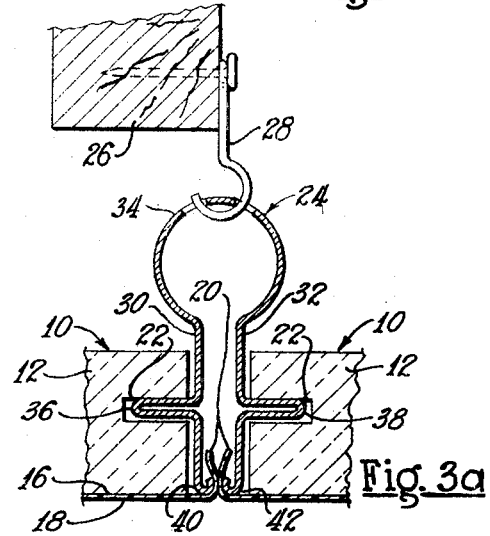
FIG. 3(a) is a fragmentary elevational view in section illustrating a modification of the supporting members of FIGS. 1, 2 and 3.

FIG. 3(a) illustrates a modified form of the support member illustrated in FIGS. 1, 2 and 3. FIG. 3(a) shows a support member which is useful in installations when it is desired to locate the ceiling in close proximity to the supporting joists. The portion 34 of the support member 24 is formed on a relatively large radius to provide a spring-like connection between the spaced parallel side walls 30 and 32. In this manner, the spacing between the joist 26 and the upper surface of the panel 10 can be made quite small, while simultaneously providing for the desired spring action between the cooperating ends 40 and 42 to securely maintain the overlaps 20 of the panels therebetween.

FIG. 5 illustrates a bracket member 44 adapted to be vertically mounted on the walls to retain the terminal end portions of the support members 24. The bracket 44 has a pair of spaced flat sections 46 and 48, each having a pair of apertures for receiving fasteners, such as nails or screws, for locating the bracket in the desired vertical position on the wall. The bracket 44 is further provided with a pair of spaced apart outwardly extending generally U-shaped sections 50 and 52. The terminal end of a support member 24 is adequately retained within the bracket 55 by positioning the side walls 30 and 32 of the support-member within the U-shaped sections 50 and 52; while the lower surfaces of the rib flanges 36 and 38 of the support member rest upon the respective upper surfaces of the U-shaped section 52 of the bracket.

It will be understood that the support members 24 may be made in any desired lengths which typically could range from ten to twenty feet. However, it may be found desirable to manufacture the support members in much shorter sections, for example, in two foot increments. The short increments could be made up into greater lengths by butting together in end to end relationship a series of members and joining them together by a splicing element 54, as illustrated in FIG. 6. The splicing element 54 consists of a sheet metal strip shaped to form a pair of generally parallel and spaced apart side walls 56 and 58, the terminal edges or end portions of which are provided with oppositely extending flange portions 60 and 62, respectively. In joining together two supporting members 24 to produce a member of greater length, the splicing element 54 is inserted into the adjoining supporting members so that the outer surfaces of the side walls 56 and 58 of the splicing element snugly engage the inner surface of the side walls 30 and 32 respectively of the support member 24. Also, the flanges 60 and 62 of the splicing element 54 are adapted to be engaged within the interior portions of the rib flanges 36 and 38 respectively of the supporting members 24. The splicing elements 54 can be used to properly join the end portions of two supporting members 24 and maintain them in proper alignment.

In assembling or installing a ceiling system employing the aforementioned elements, the support members 24 may be suspended from the joists 26 by the wire hanger devices 28. The spacing between parallel adjacent support members 24 depends upon the size of the ceiling panels 10 employed, which may range in size from relatively small ceiling tiles to four by eight foot panels or larger. After the support members 24 are properly fastened to the joists 26, the panels 10 are installed by fastening the panels in such a manner that the rib flanges 36 and 38 of the members 24 extend into the precut grooves or kerfs 22 of the panel. The rib flanges 36 and 38, at this stage of the installation, locate the panels with respect to the support members 24 and support the weight thereof.

The panel extensions 20 are then pushed upwardly and tucked between the contacting end portions 40 and 42 into the central recess between the side walls 30 and 32 of the support member. The outermost edges of the film layer 18 and the associated scrim material 16 are pulled taut to present a smooth, uninterrupted exposed surface to the lower surface of the panel 10. After the overlaps or extensions 20 have been completely tucked into the interior portion of the supporting member, the curved ends 40 and 42 resiliently grip and firmly engage the extensions 20 therebetween. The support of the panels 10 adjacent the side walls is accomplished by providing any conventional molding strips (not shown) on which the panels may rest.

FIG. 7 shows a modification of the supporting member. In the event it is desired to couple a supporting member 24 in a perpendicular relationship or at right angles to another support member 24, a portion of the terminal end of each of the flanges 36 and 38 is removed to produce slots 64 and 66 in the side walls 30 and 32 respectively. The slots 64 and 66 readily receive the rib flange 36 of the adjacent supporting member. In this manner, the supporting members 24 may be arranged in a right angular relationship with respect to one another.

FIG. 8 illustrates a modified form of the support member of the invention wherein the support member 24′ is typically fabricated from a resilient sheet material, such as relatively light gauge metal. The support member 24′ has a pair of spaced parallel side walls 30′ and 32′, the upper ends of which are integrally joined at 34′. The lower portions of the side walls 30′ and 32′ are turned upwardly and then outwardly to form a pair of outwardly extending flanges 36′ and 38′. The lowermost curved edges 70 and 72 of the side walls 30′ and 32′ are normally maintained in engagement by the spring-like action of the side walls 30′ and 32′. The flanges 36′ and 38′ are adapted to extend into the precut grooves or kerfs 22 in the adjacent fibrous panels 10 of the type illustrated in FIGS. 1, 2, 3 and 4. The overlap or extensions 20 are tucked into the interior recess or zone of the supporting member 24′ formed between the side walls 30′ and 32′ and the spring urged edges 70 and 72 retain the overlaps or extensions securely in place.

FIGS. 9 and 10 show a modified form of the support member of the invention which may typically be fabricated from either metal or plastic materials. The supporting element includes a female member, generally indicated by reference numeral 76, which is of substantially T-shaped cross section and has a horizontally disposed upper section 78 and a depending portion comprised of a pair of laterally spaced side walls 80 and 80′. The interior of the downwardly depending portion is provided with a cavity, the side walls of which have a series of inwardly and upwardly inclined portions providing a plurality of longitudinally extending, generally parallel spaced serrations 82.

The male portion of the support member illustrated in FIGS. 9 and 10, generally indicated by reference numeral 84, is formed with a generally upwardly extending upper flange section 86 having a plurality of longitudinally extending generally parallel spaced apart ribs 88 adapted to be received by the serrations 82 of the female support member 76. The wall portions adjacent the ribs slant to conform to those adjacent the serrations 82. The support member 84 further includes a pair of oppositely extending generally horizontally disposed rib flanges 90 and 92. Beneath the rib flanges 90 and 92 depends an inverted U-shaped section having a pair of parallel laterally spaced webs 94 and 96.

FIG. 10 illustrates the assembly illustrated in FIG. 9 in its assembled form, wherein the upper surface of the horizontal upper portion 78 of the female member 76 is secured to a joist 98 by a suitable adhesive material 100. It will be understood that the female member 76 may also be satisfactorily secured to the joist by wire hangers, nails, staples or other similar fastening means. The upwardly extending portion 86 of the male portion of the support member is inserted within the recess portion of the female member 76 and held in place by the interaction between the serrations 82 of the female portion and the ribs 88 of the male portion. The rib flanges 90 and 92 of the male portion of the support member extend outwardly and extend into the kerfs 22 of the composite panels 10. The overlaps or extensions 20 are tucked inside the cavity defined by the downwardly depending webs 94 and 96 and held therein by an elongate bead 102, which may satisfactorily be formed of a vinyl plastic material. The vinyl bead 102 is inserted between the webs 94 and 96 to provide a friction engagement between the overlaps or extensions 20 and the interior sides of the U-shaped cavity of the male support member 84. This engagement and the further engagement of the rib flanges 90 and 92 in the kerfed portions 22 of the panels maintain the panels 10 in their suspended supported relation. The opening beneath the vinyl bead 102 and the exposed surface of the vinyl film 18 may then be filled with a grout or caulking which is preferably of the same color as the film 18.

FIG. 11 illustrates a modification of the male portion of the support member illustrated in FIGS. 9 and 10. In this instance the male portion of the support member, generally indicated by reference numeral 84′, is formed with a pair of parallel laterally spaced downwardly extending webs 94' and 96'. The lowermost ends of the webs 94' and 96' are thickened to form inwardly extending portions 95 and 97 respectively, which extend toward each other and are slightly spaced from one another. It will be appreciated that in operation, the overlaps or extensions of the film layer of the associated fibrous panels are tucked between the portions 95 and 97 of the male portion 84' of the support element illustrated in FIG. 11. When the overlaps are tucked between the members 95 and 97, there is sufficient frictional engagement therebetween to effectively retain the overlaps or extensions therebetween.

FIGS. 12 and 13 illustrate a further modified form of the male portion of the support element illustrated in FIGS. 9 and 10. More particularly, the male portion of the support member, generally indicated by reference numeral 84" is provided with a pair of parallel laterally spaced downwardly extending webs 94" and 96". The inner walls of the webs 94" and 96" are provided with inwardly extending stop members or flat faced ribs 95' and 97' respectively. In its operative position the overlaps or extensions 20 of associated adjacent fibrous panels 10 are tucked between the stop members 95' and 97', and then a spline element 104 of generally rectangular cross sectional configuration is inserted to snugly engage between the inner surfaces of the webs 94" and 96" and the bottom walls of the stops 95' and 97'. When the spline member 104 is in the position illustrated in FIG. 13, it will be noted that the bottom surface thereof is substantially flush with the bottom surface of the adjacent panels 10, thereby creating a pleasing overall appearance of a monolithic type ceiling structure.

FIGS. 14 and 15 show a further modification of the support member of the invention, wherein there is shown a support member generally indicated by reference numeral 106 formed of resilient sheet-like material, such as thin gauged metal. The support member 106 includes a base portion 108 from which depend a pair of opposed inwardly curved web members 110 and 112. The free edge portions 114 and 116 of the downwardly depending webs 110 and 112 respectively, resiliently engage one another. The base 108 of the support member 106 is suitably secured to a joist member 118 by any suitable means, such as nails, staples, screws or the like. The support member 106 is adapted to support the ends of adjacent fibrous panels 10 in a manner similar to the support members previously described. However, it will be noted that in this embodiment, the support member 106 is not provided with means for engaging a kerf or precut groove 22 in the associated fibrous panels 10. Accordingly, the entire weight of the panels 10 is supported by the terminal portion of the support member 106. In assembling or installing the ceiling system, the overlap or extension 20 of the scrim material 16 and the resinous film 18 is tucked between the surfaces 114 and 116 into the interior of the supporting device within the zone defined by the webs 110 and 112. The resilient clamping action of the edges 114 and 116 is adequate to frictionally engage the overlap 20 and suitably secure the panel 10 in place.

Although only a single panel 10 is illustrated in FIG. 14, it will be understood that another adjacent panel 10 is to be disposed on the opposite side of the supporting member 106 and the overlap or extension portion is also tucked between the edges 114 and 116 and held in place therebetween as is clearly illustrated in FIG. 15.

FIGS. 16 and 17 illustrate a ceiling structure wherein the support element 24 is arranged to span the entire width of the room in which the ceiling is being installed. In such an arrangement, molding strips 120, formed of wood, for example, are initially nailed or otherwise suitably fastened to the upper portions of the opposed wall surfaces 122. Each of the molding strips 120 is provided with an elongate cut-out portion 124 along the entire length thereof which cooperate with the adjacent wall surface 122 to form a recessed cavity along the entire length of the molding strip suitable for receiving the overlap 20 of one end of an associated panel 10. Typically, the lower surfaces of the ends of the flanges 36 and 38 of the support element are supported on the upper surface of the associated molding strip. The panels 10 are disposed so that the grooves or kerfs 22 receive respective flanges 36 and 38. The overlaps 20 of the edges of the panel parallel to the support member 24 are tucked between the resilient end portions 40 and 42 and the other overlaps 20 are tucked into the respective recesses formed between the cut-out portion 124 and the adjacent wall surface 122. The latter overlaps are retained within the recesses by the insertion of a resilient bead 126 which is coextensive with the molding strip 120.

In this manner, the panels 10 are supported along the edges which face one another by the support member 24 which in turn is supported by the molding strips 120. The edges of the panel adjacent the walls are supported by the interrelationship of the molding strip 120 and the associated overlap 20 and the resilient bead 126. Accordingly, the supporting structure in the above described ceiling, upon completion, is completely covered and not visible to an observer.

Figure 18:
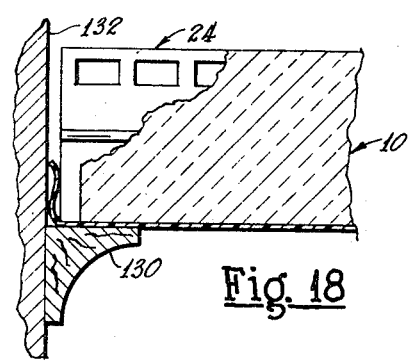
FIG. 18 is a fragmentary view partly in section of another type of a wall mounted molding structure wherein the molding is exposed.

FIG. 18 shows another type of wall mounted molding structure wherein the molding of the finished ceiling is exposed. A molding strip 130 is nailed or otherwise suitably secured at the desired height on the walls 132 completely around the room in which the ceiling is to be installed. The ends of the support members 24 are disposed to rest on the top surface of the respective molding strips 30. The panels 10 are positioned with respect to the support element 24 in the manner previously described and the overlaps or extensions 20 adjacent the walls 132 may be removed or alternatively tucked into the region between the end of the support member 24 and the wall 132 as illustrated in FIG. 18.

Figure 19:
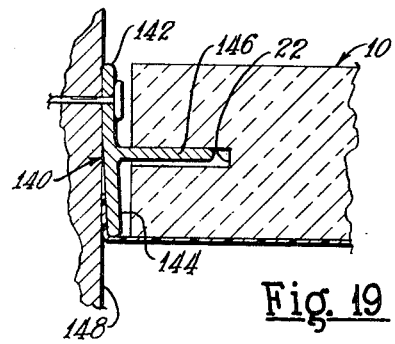
FIG. 19 is a fragmentary elevational sectional view of an arrangement for supporting the edges of a fibrous panel adjacent an associated wall.

FIG. 19 illustrates another arrangement for supporting the edges of the panels 10 adjacent the associated wall. A member 140, substantially T-shaped in cross section, and having oppositely extending flanges 142 and 144 coextensive with a base flange 146, is nailed or otherwise secured to a wall 148 at the desired height. The member 140 may be secured to the wall 148 by driving fasteners, such as nails or staples, through the flange 142 at spaced intervals therealong. In the event the member 140 was formed of a thin or light-gauge or soft metal or plastic, the nails could be driven therethrough without initially providing apertures therefor. The flange 146 is adapted to be received within, in supporting relation, the groove or kerf 22 of an associated panel 10. The flange 144 is then urged away from the wall 148 to receive the overlap or extension 20 therebehind. Since it is necessary that the flange 144 have some resiliency, it is preferable to form the member from a resilient material such as, for example, a resilient plastic. With the arrangement illustrated in FIG. 19, a ceiling structure may be constructed with no visible supporting structure adjacent the walls.

Figure 20:
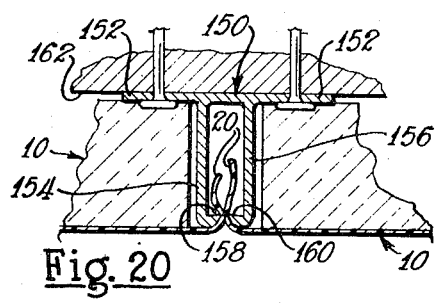
FIG. 20 is a fragmentary sectional view of a modified form of a supporting member for supporting the fibrous product of the invention.

There is shown in FIG. 20 a modified form of the supporting member illustrated in FIGS. 14 and 15 and is particularly advantageous for use in rooms where height is at a premium. The support member 150 consists of a substantially flat strip-like base 152 having a pair of resilient spaced apart webs 154 and 156. The free edge portions 158 and 160 of the webs 154 and 156, respectively, are adapted to resiliently engage one another. The support member 150 is suitably secured to a joist or existing ceiling 162 by nails or staples, for example. After the support member 150 is secured to the joists 162, the panels 10 are held adjacent thereto, and the overlaps or extensions 20 are tucked into and held snugly between the edge portions 158 and 160. Since the base 152 is preferably formed with a small thickness dimension, the upper surfaces of the panel 10 are adapted to be disposed in close proximity to the lower surface of the support joists. By virtue of the billowy nature of the fibrous material 12 of the panels 10, in certain applications the upper surface of the panel 10 adjacent the joist 162 may actually be in contact with the lower surface of the joist. Depending upon the size of the panel 10, and also the density of the fiber material 12, it may be found desirable to adhesively secure the upper surface of the panel 10 to the adjacent floor surface of the joist 162 to provide for additional support for the portion of the panel between the support members 150.

The embodiment illustrated in FIG. 20 has been found useful in supporting wall panels as well as ceiling panels. In view of the juxtaposed relationship of the panel 10 to the surface of the supporting surface 162, the possibility of damaging the panel by accidentally applying a force or load against the central portion thereof between the spaced apart supporting members is clearly mitigated.

Figure 21:
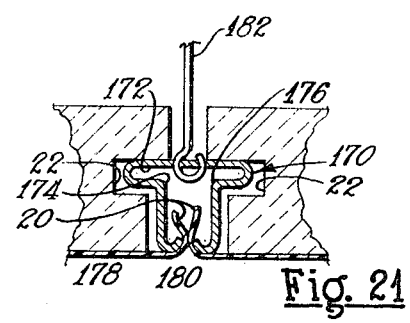
FIG. 21 is a fragmentary sectional view of another modified form of a supporting member for supporting the fibrous product of the invention.

In FIG. 21, another modification of the support member is illustrated. The support member 170 comprises a base portion 172 having a pair of spaced apart webs 174 and 176 which depend from the opposite edges thereof. The free edge portions 178 and 180 of the webs 174 and 176, respectively, are adapted to resiliently engage one another. The support member 170 is suitably suspended from a joist or existing ceiling, not shown, by a wire 182. After the support member 170 is suspended, the grooves or kerfs 22 of the panels 10 are positioned on the opposed oppositely extending surfaces of the base 172 and the overlaps or extensions 20 are tucked into and held snugly between the resilient free edges 178 and 180.

FIG. 22 shows a pair of support members connected at right angles to one another in the manner illustrated in FIG. 7, wherein the horizontally extending flanges 38 of the cooperating support members are employed to support a mechanism 190, such as a recessed lighting fixture. The mechanism 190 could include a heating and ventilating grill, a loud speaker assembly, etc. Accordingly, a composite ceiling structure may be produced employing concealed supporting members 24, which function to simultaneously support ceiling panels 10, as well as other ancillary apparatus.

In FIG. 23 there is illustrated another arrangement wherein the ceiling panels 10 are employed in conjunction with a recessed mechanism 200 such as combined lighting, heating and ventilating assembly. The mechanism 200 may be fabricated from sheet metal and includes a main body 202 which is supported by wires or other hanger devices, not shown. A plurality of apertures 204 is formed in the upper portion of the main body 202 for the passage of air therethrough. Suitable light sources 206, such as fluorescent tubes, are disposed beneath the under surface of the main body 202.

The main body 202 has downwardly depending side walls 208, only one side being shown for the sake of simplicity. The side wall 208 is formed to provide a laterally extending flange 210. Below the flange 210, the side wall 208 is bent or shaped to form an upwardly extending reservoir or cavity 212. The lower edges 214 and 216 of the reservoir 212 are resiliently urged together.

The free end portion 218 extends laterally in a direction opposite to the flange 210. The free end portion 218 cooperates with a similar portion on the opposite side of the mechanism 200 to support a perforated light diffuser 220. Manifestly, the diffuser 220 suitably diffuses the transient light energy emanating from the light sources 206 as well as permits the passage of air therethrough.

The flange 210 is received with the kerf 22 of an associated panel 10, while the edges 210 and 216 snugly engage and retain the overlap 20 of the panel.

Since the elements of the supporting network of the systems illustrated in FIGS. 22 and 23 are concealed, it will be appreciated that attractive and monolithic-ceiling structures, employing recessed lighting, heating and ventilating, or loudspeaker assemblies, can be readily and economically produced.

Although specific mention has been made throughout the foregoing description and accompanying drawings of the use of a glass reinforced film in association with the fibrous bodies, it will be appreciated that other materials could be satisfactorily employed without departing from the spirit of the invention. Such other materials would include cloth facings, coated cloth, impregnated cloth and plastisols.

We claim:
1. A supported panel system comprising in combination:
   a plurality of panels arranged in a planar array, each of said panels being faced with sheet material, the facing of said panels extending beiond the main body thereof providing flexible flap-like ends; and
   a plurality of structural support elements arranged in a grid-like manner to cooperatively support said panels, said elements including a pair of parallel closely spaced web portions each having first and second marginal edges spaced from each other, means for integrally connecting said webs together adjacent said first marginal edges, extensions of said second marginal edges turned upwardly and outwardly providing opposed laterally projecting flanges for supporting marginal edge portions of said panels, and resilient nipping means disposed along said second marginal edges of said webs compressively engaging the flap-like ends of the sheet material facing said panels pulling taut the sheet material of said panels thereby providing support and locating said panels by said support elements.

References Cited
UNITED STATES PATENTS

| | | | |
|---|---|---|---|
| 1,997,048 | 4/1935 | Demmy. | |
| 2,156,670 | 5/1939 | Uum. | |
| 3,205,628 | 9/1965 | Frisk | 52—222 |
| 3,205,546 | 9/1965 | Nelson. | |
| 3,327,444 | 6/1967 | Downing | 52—496 |

JOHN E. MURTAGH, Primary Examiner

U.S. Cl. X.R.
52—496